United States Patent [19]
Chittofrati et al.

[11] Patent Number: 5,725,802
[45] Date of Patent: Mar. 10, 1998

[54] PREPARATION OF ULTRAFINE PARTICLES FROM WATER-IN-OIL MICROEMULSIONS

[75] Inventors: Alba Chittofrati; Viviana Boselli, both of Milan, Italy

[73] Assignee: Ausimont S.p.A., Italy

[21] Appl. No.: 477,766

[22] Filed: Jun. 7, 1995

[30] Foreign Application Priority Data

Jun. 9, 1994 [IT] Italy .................. MI94A1212

[51] Int. Cl.[6] .......................... B01J 13/00; C01G 49/02
[52] U.S. Cl. ................. 252/309; 252/314; 252/62.56; 423/634
[58] Field of Search ................. 252/309, 313.1, 252/314, 62.56; 423/633, 634

[56] References Cited

U.S. PATENT DOCUMENTS

| | | | |
|---|---|---|---|
| 3,665,041 | 5/1972 | Sianesi et al. | 568/615 |
| 3,784,471 | 1/1974 | Kaiser | 252/62.56 |
| 4,523,039 | 6/1985 | Lagow et al. | 568/615 |
| 4,599,184 | 7/1986 | Nakatani et al. | 252/309 |
| 4,613,520 | 9/1986 | Dasgupta | 252/62.56 |
| 4,981,819 | 1/1991 | Rinn | 501/12 |
| 4,990,283 | 2/1991 | Visca et al. | 252/309 |
| 5,049,307 | 9/1991 | Tabony | 252/309 |
| 5,180,512 | 1/1993 | Nakatani et al. | 252/309 |
| 5,238,671 | 8/1993 | Matson et al. | 252/309 |
| 5,484,766 | 1/1996 | Shah et al. | 505/441 |

FOREIGN PATENT DOCUMENTS

| | | | |
|---|---|---|---|
| 0 051 526 | 5/1982 | European Pat. Off. | |
| 0 148 482 | 7/1985 | European Pat. Off. | |
| 0 250 766 | 1/1988 | European Pat. Off. | |
| 363 927 | 4/1990 | European Pat. Off. | 252/313.1 |
| 0 370 939 | 5/1990 | European Pat. Off. | |

OTHER PUBLICATIONS

Robinson et al., "Characterisation of Cadmium Sulphide Colloides in Reverse Micelles," *Colloids and Surfaces* 61, 175–188, (1991) Month unavailable.

Persico et al., "Synthesis of Perfluoropolyethers via Hydrocarbon Polyesters: A New General Method," *J. Am. Chem. Soc.* 107, 1197–1201, (1985) Month unavailable.

López–Quintela et al., "Chemical Reactions in Microemulsions: A Powerful Method to Obtain Ultrafine Particles," *Journal of Colloid and Interface Science* 158, 446–451, (1993) Month unavailable.

Boutonnet et al., "The Preparation of Monodisperse Colloidal Metal Particles From Microemulsions," *Colloids and Surfaces* 5, 209–225, (1982) Month unavailable.

Davies et al., "The Effect of Temperature and Oleate Adsorption on the Growth of Maghemite Particles," *Journal of Magnetism and Magnetic Materials* 122, 24–28 (May 27, 1993).

Derwent Abstract, AN 90–117487/16 (corresponding to EP 363927–A and US 4,981,819), 1990.

*Primary Examiner*—Richard D. Lovering
*Assistant Examiner*—Daniel S. Metzmaier
*Attorney, Agent, or Firm*—Finnegan, Henderson, Farabow, Garrett & Dunner, L.L.P.

[57] ABSTRACT

Process for preparing ultrafine inorganic particles of size lower than 50 nm, preferably lower than 10, with narrow size distribution, of metals, oxides, sulphides, carbonates by starting from microemulsions of water in a fluorinated oil, preferably a perfluoropolyether oil, containing metal ions in the aqueous phase and by reacting them with a reactant which is gaseous, or vapour, in the reaction conditions, for obtaining the above indicated compounds.

12 Claims, No Drawings

PREPARATION OF ULTRAFINE PARTICLES FROM WATER-IN-OIL MICROEMULSIONS

The present invention relates to a process for preparing dispersions of ultrafine inorganic particles, having sizes lower than 50 nm, preferably lower than 10 nm, and with a narrow size distribution.

Nanosize particles represent an intermediate state of the matter, between the molecules and the solids and display unusual electronic, optical, magnetic and chemical properties owing to their extremely small size, as shown in recent literature on semiconductors and photo-semiconductors (ref. B. H. Robinson et al in Colloids and Surface, 61 (1991) 175–188; Characterization of cadmium sulphide colloids in reverse micelles).

When the nanosized particles consist of magnetic materials, such as magnetite or magnetite, they have superparamagnetic properties.

Also, in the application as pigments the small size and the narrow size distribution are preferred to have stable and uniform distribution of the particles; these characteristics improve the uniform application (colour monogeneity) and the shelf-life of the dispersion.

It is well known that particles of such sizes, having a high surface/volume ratio, have also very good characteristics as catalysts. Also in the applications as ceramic materials it is known that the mechanical properties increase when ultrafine particles allowing an high density packing ratio are utilized.

The method of the invention can be applied to any type of inorganic particles prepared in aqueous medium, in particular to metal oxides, preferably magnetic oxides.

More in detail the process of the invention is described for preparing dispersions of magnetic oxide in situ having high concentrations and high magnetic characteristics.

Several routes are known for the preparation of dispersions of magnetic oxides in non aqueous mediums, such as hydrocarbons, by precipitation of the solid in aqueous phase and subsequent transfer of the solid into the organic medium by means of a suitable surfactant.

For the transfer use is made of a surfactant, which is generally added to the particle aqueous dispersion to form coated particles which can be directly transferred into the oil or extracted and dried from water prior their redispersion in oil.

These methods are known as two steps processes since the magnetic particles are first prepared in aqueous medium and then are transferred into the oil.

The drawback of these methods is the scarce size control of the particles, both as size and as size distribution. As a matter of fact, aggregation phenomena can occur in these processes.

Moreover, in an aqueous reaction medium particles of large sizes, generally larger than 100 nm, are obtained.

It is also known in the art that in order to limit the growth of the particles to the diameter lower than 50 nm, it is necessary to utilize microemulsions of water in hydrocarbon, see for instance EP 370,939 and the article "Chemical Reactions in Microemulsions: A Powerful Method to Obtain Ultrafine Particles", M. Arturo Lopez-Quintela and Josè Rivas—Journal of Colloid and Interface Science 158, 446–451 (1993).

By these methods, the size distribution is narrower compared with that obtained in water. Moreover the dispersion of the magnetic oxides so obtained gives a quicker response, to an externally applied magnetic field, than the particles obtained in water indicated above. In fact, no magnetic hysteresis phenomena occur since the rearrangement of the magnetic dipoles of the particles into the magnetic field is practically instantenous.

Hence, these materials display superparamagnetic behaviour.

A further charateristic of the particle dispersions is their stability against sedimentation upon aging. In fact, if particle aggregation occured on storage or use of these dispersions, it would not be possible to obtain stable enough dispersions for uses in magnetically driven devices where high dispersion stability is required to the magnetic fluids.

In the prior art, however, no processes are known for producing ultrafine particles from microemulsions of water in hydrocarbon which use a gaseous reactant as reactant to obtain the type of desired particles. For instance, M. Boutonnet et al. in the paper "The preparation of monodispersed colloidal metal particles from microemulsions", in Colloids and Surfaces, 5 (1982) 209–225, shows that in order to obtain ultrafine powders of metals, such as platinum and iridium, to be utilized as catalysts, it is necessary to start from microemulsions containing a complex salt of these metals and to carry out the reduction with a reducing agent in the liquid form to obtain the reaction in reasonable times, of about 15/20 minutes. Comparative examples show that when a gaseous reducing agent, such as hydrogen, is used, the reaction does not occur even after some hours.

The Applicant has now surprisingly and unexpectedly found that it is possible to prepare ultrafine particles of metals, oxides, sulphides, carbonates, starting from water-in-oil microemulsions, by utilizing a reactant, leading to the desired type of compound, in gaseous form or in the form of vapour under the reaction conditions.

The subject matter of the present invention is a process for preparing ultrafine inorganic particles of sizes lower than 50 nm, preferably lower than 10 nm, of metals, oxides, sulphides, carbonates starting from microemulsions of water in a fluorinated oil containing metal ions in the aqueous phase and reacting them with a reactant in the form of gas or vapour under the reaction conditions.

The particles types which can be obtained, are for instance, the oxides obtained by reaction with bases, such as for instance ammonia. Oxides where metal ions have higher electronic charge can also be obtained starting from the corresponding metal ions with lower electronic charge if oxygen or air are also used as additional gaseous reactant, in combination with the gaseous base.

In case of oxides, depending on the type of the desired oxide, the reaction can be carried out at the pH value and by using heat at the temperature required to form the targeted oxide.

The skilled in the art can easily select the pH and temperature to be utilized depending on the type of oxide and on the amorphous or crystalline structure.

Carbonates can be obtained if carbon dioxide is utilized as gaseous reactant.

Sulfides can be obtained if hydrogen sulfite is utilized.

When the reduction is carried out with hydrogen, ultrafine particles of metals are obtained.

The skilled in the art can utilize a gaseous reactant, or a reactant which is a vapour, under the reaction conditions, to obtain ultrafine particles under the desired form.

For illustrative but not limitative purposes of the present invention, the production of magnetic oxides starting from solutions of ferrous salts (Fe(II)) is described.

The obtained magnetic oxide has the form of gamma-$Fe_2O_3$ (maghemite) or ferrite $Fe(II)Fe(III)_2O_4$ (magnetite).

In this case ammonia is preferably utilized as gaseous reactant and the reaction is carried out in the presence of oxygen and/or air.

In this case, dispersions of magnetic oxides are obtained in concentrations higher than those obtainable using the processes of the prior art with hydrocarbon microemulsions also by using the ammonia reactant in liquid phase.

In practice, an emulsion of water in fluorinated oil is prepared according to the method described in the following patent applications in the name of the Applicant, Italian appln. No. 19494A/87 and EP patent 250766, the aqueous phase utilized for preparing microemulsions contains the metal salt of which the ultrafine particles are to be prepared. In this case a ferrous salt is utilized.

The metal salt (reactant for preparing the solid) is present in the aqueous solution forming the dispersed phase of the microemulsion which has a fluorinated oil as continuous oil-phase.

The W/O microemulsions utilized as precursor or reaction medium comprise at least a fluorinated oil, preferably of perfluoropolyether type (PFPE) as continuous phase, one or more fluorinated surfactants, preferably (per) fluoropolyethers and optionally cosolvents, for instance alkanol, or cosurfactants, for instance PFPE alcohols.

The aqueous phase consists of solutions of one or more metal salts, for intance ferrous and/or ferric salts, Co, Ni, Mn, Zn, Ba, Al salts, etc.

As metal salts soluble in water, for instance, the inorganic salts can be used, such as chlorides, nitrates, sulphates, chlorates, etc. or also the organic salts such as acetates, etc.

In case of the preparation of magnetic oxides, the microemulsions of the type water-in-perfluoropolyether, containing the inorganic reactant, are alkalinized and heated before or after the introduction of the gaseous reactant, in conditions of temperature/time depending on the oxide type.

The alkalinization is carried out by a gaseous base, for instance ammonia, or a vapour phase containing an alkylamine, for instance, methyl- or ethyl-amine, fed to the system by means of an inert gas or air.

Obviously and this is a general criterium of the present invention, the metal cations do not form stable complexes with the base at the reaction temperature, since it would limit or inhibit the formation of the desired oxide.

Moreover, the metal cation does not form stable complexes with the other components of the microemulsion at the reaction temperature, this is particularly important when ionic surfactants are used.

The magnetic particles directly generated in fluorinated oil or perfluoropolyether are ultrafine, with diameter generally lower than 50 nm, preferably lower than 10 nm. Such particles have narrow size distribution. To the greater size uniformity of the particles, a greater colloidal stability of the dispersions is associated, resulting in superior durability upon aging and/or higher properties in application (colour in case of pigments/paints, stability in magnetic field for magnetic fluids, high and constant area in case of heterogeneous catalysts).

At the end of the reaction, the particles can be extracted from the systems or the obtained dispersion in oil can be considered the end-product, for instance ferrofluids.

The technique of the present invention allows to minimize the number of components of the reaction system.

It is also possible to minimize, compared with other procedures, the excess of base and the amount of undesired reaction by-products, for instance the salts resulting from the combination of the counter-ions of the inorganic base and of the metal salt reactant so to maximize the amount of useful solid in the dispersion.

Not only this process simplifies the purification of the final product (particles or dispersion) from reaction by-products, but a more important aspect is the possibility to maximize the reactant concentration.

The use of a bivalent metal ion, as ferrous ion, allows to operate with ⅔ of counter-ions, for instance chloride, which would be necessary if operating with the same molar amount of ferric salt. The aqueous phase of the microemulsion can therefore contain higher concentration of the bivalent salt with respect to the corresponding trivalent salt.

The negative effect of a strong increase of ionic strength on the formation of W/O microemulsions, when ionic surfactants are employed (cationic or anionic surfactants), is known in the formulative art concerning microemulsions. Such effect can be minimized with the above reported procedure. This aspect is important to achieve high reactant content in the reaction system while preventing undesired phase separation during the particle nucleation. Also, non-ionic surfactants can be used, with reduced sensitivity to ionic strength but their higher sensitivity towards temperature has to be taken into account.

When the reaction is over, it is possible to separate the aqueous phase initially present in the system and obtain the solid particles in the oil phase.

The concentration of the ultrafine particles is modulated by the initial concentration of the metal cations in the system, for instance the concentration of the bivalent metal salt in water and the concentration of the aqueous phase in the PFPE oil, and can exceed the known values for particle preparation in hydrocarbon microemulsions.

In case of the magnetic oxides directly generated in the microemulsion, the prior art on hydrocarbon microemulsions does not supply magnetization data of the dispersions. This is likely to be due to the low concentrations of the obtained magnetic particles, for instance, 0.1–3% by weight of solid in an hydrocarbon having density lower than 1 g/ml.

Dispersions with higher content of magnetic particles, for instance 4–10% by weight of solid in PFPE oil with 1.6–1.9 g/ml density and a consequent considerable increase of the fraction by volume of the solid in PFPE, can be obtained in PFPE when the above reported procedures are used.

These concentrated dispersions show values of magnetic saturation higher than those obtainable with the same fluorinated chemicals by utilizing the procedures of the prior art for hydrocarbon microemulsions.

The particles of the obtained magnetic dispersions have always magnetic diameter lower than 10 nm and narrow size distribution from the magnetization curves that practically show the absence of hysteresis.

The reaction temperature depends on the type of the desired oxide, for the magnetic oxides temperatures higher than 60° C. are used.

It is also possible to operate under pressure and at higher temperatures, the limit being the surfactant degradation temperature.

For the generation of magnetic particles in water, a high reaction temperature is known to favour crystallization, but it generally causes the growth of particle sizes in the time. In a fluorinated microemulsion according to the present invention, such a growth is limited and nanosize particles are obtained even after very prolonged aging at high temperature (hours, days).

The microemulsions water-in-oil are described in Italian patent application 19494 A/87 herein.

The fluoropolyethers suitable to form the microemulsions subject matter of the present invention are those having average molecular weight from 500 to 10,000 and preferably from 500 to 3,000 and containing repetitive units selected from the following classes:

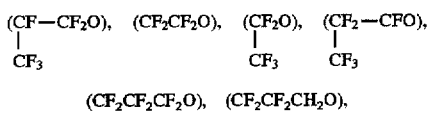

said units being statistically distributed in the polymeric chain, having fluoroalkyl or perfluoroalkyl end groups which can contain H or Cl. In particular, they belong, preferably, to one or more of the following classes:

1) 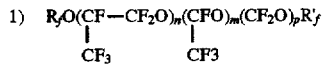

having random distribution of the perfluorooxyalkylene units, wherein $R_f$ and $R'_f$ equal or different from each other are —$CF_3$, $C_2F_5$, $C_3F_7$, —$CF_2H$ and n, m, p have average values such as to meet the aforesaid requirements of average molecular weight reported above;

2) $R_fO(CF_2CF_2O)_{n'}(CF_2O)_{m'}R'_f$ with random distribution of the perfluorooxyalkylene units, wherein $R_f$ and $R'_f$ equal or different from each other are —$CF_3$ or —$C_2F_5$ and m' and n' are integers such as to meet the above reported retirements;

3) 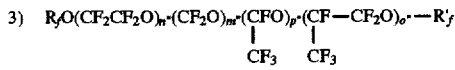

wherein $R_f$ and $R'_f$ are similar to those indicated in class (1) and m", n", p", o" are integers such as to meet the above reported requirements;

4) 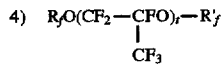

wherein $R_f$ or $R'_f$ equal or different from each other are —$C_2F_5$ or —$C_3F_7$ and t is an integer such as to meet the above reported requirements;

5) $R_fO(CF_2CF_2O)_zR'_f$, wherein $R_f$ and $R'_f$ equal or different from each other are —$CF_3$, —$C_2F_5$ and z is an integer such as to meet the above reported requirements;

6) $R_f)(CF_2CF_2CF_2O)_sR'_f$ wherein $R_f$ and $R'_f$ equal or different from each other are —$CF_3$ or $C_2F_5$ or —$C_3F_7$ and s is an integer such as to meet the above reported requirements.

Perfluoropolyethers of class (1) are known in trade by trademark FOMBLIN® Y or GALDEN®, those of class (2) by trademark FOMBLIN® Z all of Montedison. Products of class (4) known in trade are KRYTOX® (Du Pont).

The products of class (5) are described in U.S. Pat. No. 4,523,039; those of class (6) are described in European patent EP 148.482 of Daikin.

Those of class (3) are prepared according to U.S. Pat. No. 3,665,041. The perfluoropolyethers described in U.S. Pat. No. 4,523,039 or in J. Am. Chem. Soc. 1985, 107, 1195–1201 are also suitable.

The surfactants used in the preparation of the microemulsion subject matter of the present invention consist of fluorinated molecules, and they can be ionic or non ionic. It is preferred that the surfactant has structure similar to that of the oil as regards the hydrophobic part. In particular it can be mentioned:

a) perfluorocarboxylic acids having 5–11 carbon atoms and their salts;

b) perfluorosulphonic acids having 5–11 carbon atoms and their salts;

c) non ionic surfactants characterized by the general formula: $R_f(CH_2)(OC_2H_4)_nOH$ wherein $R_f$ is a fluorocarbon chain; and n is an integer at least equal to 1, described in European patent application EP 0051526;

d) mono- and di-carboxylic acids derived from perfluoropolyethers and their salts;

e) non ionic surfactants formed by a perfluoropolyether chain bound to a polyoxyalkylene chain;

f) cationic perfluorinated surfactants or derivatives from perfluoropolyethers with 1, 2 or 3 hydrophobic chains.

As co-surfactants or co-solvents can be used:

hydrogenated alcohols having from 1 to 12 carbon atoms;

alcohols derivated from perfluoropolyethers;

alcohols formed by a perfluoropolyether chain bound to an alkyl or polyoxyalkylene chain or alcohols formed by a partially fluorinated chain.

The following examples are given for indicative but not limitative purpose of the present invention.

EXAMPLES

Preparation of Microemulsions

The general procedure reported in EP Patent 250,766, limitedly to the preparation of microemulsions of water-in-oil type, is used.

Continuous phase: fluorinated oil or perfluoropolyether oil

At least a fluorinated oil, preferably a PFPE oil having an average molecular weight MW from 500 to 3000, is used. Mixtures of oils with different MW can also be used. Perfluoropolyethers of class 1 are preferably used.

Surfactants

Those reported, for instance, in EP 250,766 are utilized, for instance salts of monocarboxylic acids, for instance with structure of class 1 and indicated molecular weight.

The carboxylates have generally monovalent counterions, Na, K, ammonium which does not interfere with the metal cations incorporated in the aqueous phase.

A single microemulsiuon can contain more PFPE surfactants, preferably with the same end group, for instance mixtures of PFPE surfactants having different MW.

Optional cosurfactants/cosolvents

Cosolvents, for instance water soluble alkanols as EtOH, iso-PrOH, etc., or cosurfactants, for instance alcohols having PFPE structure, soluble in PFPE oil, can be necessary or favourable to the solubilization of the aqueous phase in PFPE oil, according to the prior art relating to the above reported fluorinated microemulsions. Type and amounts of such additives vary depending on the choice of the other components. As cosurfactants, fluorinated alcohols, for instance PFPE alcohols obtained by reduction of the corresponding acids, or ethoxylated fluorinated alcohols can be used.

Aqueous phase dispersed in PFPE:

The aqueous phase contains at least one water soluble-metal salt which is the reactant for the formation of the oxide.

The metal salts can be nitrates, phosphates, chlorates and in general water-soluble halides, with concentration higher than 0.0001 mol/l and preferably higher than 0.1 mol/l.

Ferrous chloride is used in the examples as preferred. The amount of aqueous phase in microemulsion can vary from 1 to 30% by weight depending on the type and amount of each component (surfactant, cosurfactant, inorganic salt) and on the temperature.

It is preferably higher than 10% by weight.

Alkalinizing agent

A base is bubbled through the reaction system in the form of gas or vapour, optionally diluted in an inert gaseous carrier or air, depending on the desired oxidation degree. The stream of the base into the reaction system causes the desired rise of its pH value, so to enable the oxide formation.

Examples A-I demonstrate water-in-oil microemulsions which may be used according to practice of the invention.

EXAMPLE A

To 5 ml of a perfluoropolyether of class (1), having an average molecular weight of 650, there are added, 5.40 g of an acid with perfluoropolyether structure, having a carboxy functional group ($R'_f$—$CF_2COOH$), containing only a few amount of bicarboxylic acid ($R_f$=$R'_f$=—$CF_2COOH$), with an average equivalent weight of 735, salified by means of 1 ml of an aqueous solution of ammonium hydroxide containing 10% of $NH_3$ by weight. The complete dissolving of the aqueous phase in the oil was achieved by heating the sample to 40° C. By cooling to room temperature, the separation occurred into two phrases, but by heating the sample back to a temperature higher than 40° C., the microemulsion, containing 6.5% by weight of water, formed again spontaneously.

EXAMPLE B

To 6.56 of the ammonium salt of a carboxy acid having a perfluoropolyether structure, belonging to class (1), having an average equivalent weight of 700, 5 ml of the same perfluoropolyether as disclosed in Example A, and 3 ml of water are added, with one single clear phase being obtained, which is stable at temperatures higher than 30° C. Such a microemulsion can be diluted with perfluoropolyether up to 4 times its initial volume, in this case a microemulsion being obtained, which is indefinitely stable at room temperature.

EXAMPLE C 5 ml of said perfluoropolyether as disclosed in Example A dissolves 3 ml of water in the presence of 5.34 g of the ammonium salt of carboxylic surface-active agent having a perfluoropolyether structure, belonging to class (1), having an average equivalent weight of 600. A microemulsion, stable at temperature higher than 11° C., forms spontaneously.

EXAMPLE D 3.4 ml of a perfluoropolyether having an average molecular weight of 600, belonging to class (1), dissolves 2 ml of water in the presence of 1 ml of a carboxy acid having a perfluoropolyether structure, belonging to class (1), having an average equivalent weight of 694, neutralized with 0.6 ml of an aqueous solution of ammonium hydroxide, containing 20% of $NH_3$ by weight, and of 0.4 ml of tert-butyl alcohol. A clear phase, stable at temperatures lower than 30° C., is obtained.

EXAMPLE E 5 ml of a perfluoropolyether having an average molecular weight of 800, belonging to class (1), dissolves 1.1 ml of water and solution of ammonium hydroxide containing 10% of $NH_3$ by weight, in the presence of 2 ml of a carboxy acid of perfluoropolyether structure, belonging to class (1), with an average equivalent weight of 630. By simply mixing the components, a clear liquid, stable at room temperature is obtained; by heating to a temperature higher than 35° C., the separation into two phases occurs, and the product becomes cloudy; by cooling to a temperature lower than 35° C., the product turns again into a microemulsion stable over time. This microemulsion, which contains 7.9% of water, can dissolve water up to a content of 11.1% of water, with its existence range being reduced to temperature lower than 28° C. The stability range can be extended by the addition of an alcohol having molecular weight 700, deriving from a perfluoropolyether of class (1): in fact, the addition of 1.3% b.w. of alcohol is enough to have a microemulsion indefinite stable at temperature lower than 65° C.

EXAMPLE F

To 2 ml of a perfluoropolyether belonging to class (1), having molecular weight 800, 1 ml of a surface-active agent of perfluoropolyether structure belonging to class (1) and with molecular weight 690, 1 ml of $NH_3$ at 10% by weight, and 0.1 ml of a 1-nonanol are added. One single clear phase, stable at temperatures comprised within the range of from 0° C. to >95° C., is obtained.

By the further addition of 0.1 ml of $H_2O$, the stability range results to be from about 1° C. to about 62° C.

EXAMPLE G

A matrix composed by 5 ml of a perfluoropolyether having an average molecular weight of 800, 1.5 ml of PFPE-structure carboxy acid with average equivalent weight 636 and 0.5 ml of ammonium hydroxide solution at 10% of $NH_3$ by weight, is clear all through the investigated temperature range (from 15°–20° C. to 90°–95° C.) and contains 4.0% by weight of aqueous phase, and 74.1% by weight of oil phase. This matrix is capable of reversibly dissolving water, with the following behavior:

| Added $H_2O$ ml | w % by weight | Range of Existence of w/OF Microemulsion |
|---|---|---|
| 0.1 | 4.8 | T ≥ 31° C. |
| 0.2 | 5.6 | T ≥ 45° C. |
| 0.4 | 7.1 | T ≥ 63° C. |

EXAMPLE H

To the matrix as disclosed in Example G, 0.2 ml of methyl alcohol is added. The system is liquid and isotropic (w=4.0%) all through the investigated temperature range; it is capable or reversibly microdispersing water, showing the following behavior:

| Added $H_2O$ ml | w % by weight | Range of Existence of w/OF Microemulsion |
|---|---|---|
| 0.1 | 4.8 | any temperatures |
| 0.2 | 5.5 | T ≤ 73° C. |
| 0.4 | 7.0 | T ≤ 67° C. |
| 0.6 | 8.4 | T ≤ 62° C. |
| 1.0 | 11.1 | 36° ≤ T ≤ 59° C. |
| 1.4 | 13.7 | 36° ≤ T ≤ 70° C. |
| 2.2 | 18.4 | 28° ≤ T ≤ 37° C. |

EXAMPLE I

To the matrix as disclosed in Example G, 0.2 ml of ethanol is added, a system being obtained, which is liquid and isotropic all through the investigated temperature range, which microdisperses reversibly water, with the following behavior:

| Added H₂O ml | w % by weight | Range of Existence of w/OF Microemulsion |
|---|---|---|
| 0.2 | 5.5 | any temperatures |
| 0.6 | 8.4 | any temperatures |
| 1.0 | 11.1 | 23° ≦ T ≦ 85° C. |

Characterization of the dispersions and of the extracted powders

The amount of magnetic powder with adsorbed surfactant is determined by removing from known portions of the dispersion, the components soluble in suitable solvents such as water, water/isopropanol mixture typically in the ratio 1:1 by volume and in solvent of chlorofluorocarbon type, such as Delifrene or Freon.

The powder extracted is dried under vacuum, in the presence of silica gel, at a moderate temperature, typically not higher than the temperature at which the preparation has been carried out.

To evaluate the amount of surfactant bound to the particles (chemical adsorption), the dry powder is analysed thermogravimetrically with a TGA Du Pont 2000 instrument.

The weight loss of the powder is determined after heating up to 600° C. for the complete removal of adsorbed surfactant.

The TGA value is necessary to calculate the actual fraction of solid in the powder and then in the fluorinated dispersion.

The type of oxide is identified by X-ray diffraction according to the conventional procedures. The small size of the particles causes a broadening of the peaks observed and it is not possible to discriminate between magnetite and maghemite, while the presence of oxide components other than $Fe_3O_4$ or gamma-$Fe_2O_3$ can be excluded.

Density of the dispersions

The density value of the dispersion has been either measured by the pychnometric method ASTM D70-82 or evaluated by considering additive the densities of the components. The value is used for the calculation of the magnetic saturation in Gauss from the experimental value in emu/g.

The measurements of magnetic saturation (MS) have been carried out as described by K. J. Davies, S. Wells and S. W. Charles in Journal of Magnetism and Magnetic Materials 122 (1993) 24–28.

A Vibrating Sample Magnetometer, Princeton Applied Research (PAR) 155 VSM, has been used. The measurements were carried out at 25° C.

MS was obtained from measurements of susceptibility vs. magnetization between 8.5 and 9.5 kOe. The particle average magnetic diameter was estimated from the value of magnetic saturation and of reduced initial susceptibility and from the sample composition by using the correlations known in literature and used by Charles et al. in the reference cited above.

The experimental values in emu/g were then converted into Gauss MS (Gauss)=MS (emu/g)* 4πd wherein d is the density of the dispersion or powder. For the powder, the tabulated density value of 5.18 g/cm³ has been used.

EXAMPLE 1

13.9 g of the ammonium salt of a perfluoropolyether monocarboxylic acid with the structure of class (1), wide distribution of molecular weights and average MW 580, were mixed, at room temperature, to 11.36 g of perfluoropolyether oil of class (1) (GALDEN® D02, average MW about 800) in a glass reaction vessel equipped with inlet and outlet for the gas bubbling and with additional inlets for the monitoring of pH and, optionally, of the temperature. 3.64 g of a 1 molar acqueous solution of ferrous chloride were added.

After few minutes of gentle mixing, the system was a single transparent phase (W/O microemulsion) with a brown coloration, consisting of 48.1% by weight of surfactant, 39.3% of oil and 12.6% by weight of dispersed aqueous phase containing the metal reactant (0.21 molar ferrous salt with respect to the microemulsion, assuming as additive the densities of the components). The initial pH was 3.6. The system was not sealed and allowed the presence of air.

The microemulsion was heated to 60° C. Gaseous ammonia obtained by flowing nitrogen firstly through a 30% solution of ammonia and then in the reaction container was introduced in the reaction system up to 7.5 pH and the heating was continued for 3½ hours.

During this time the system changed into a black dispersion, that was then cooled to room temperature.

Three washings with isopropanol and water removed the excess of surfactant and the ammonium chloride which was the reaction by-product. Then a magnetic black dispersion was obtained by mild centrifugation (100 rpm for 5 m) and supernatant removal.

The characterization of weighted portions of this dispersion and of the powder extracted therefrom (according to the process described in characterization methods) assessed that:

the particles with the adsorbed surfactant layer constituted the 5.1% by weight of the dispersion, the 2.2% by weight of the dispersion consisted of the pure magnetic solid which showed an X-rays diffraction pattern coincident to the X-ray spectra of magnetite and magnetite, which are not distinguishable from each other when the particle size is small.

The magnetic saturation of the dispersion was 29 Gauss (1.23 emu/g) and the particles had average magnetic diameter of 6 nm.

The extracted powder had magnetic saturation of 2278 Gauss.

By repeating this test with a heating time of 5.5 hours or 24 hours, dispersions similar to the previous one for type and content in magnetic oxide, were obtained. In particular it was noticed that the magnetic diameter of the particles always remained between 6–6.4 nm.

EXAMPLE 2

The surfactant and the perfluoropolyether oil were the same as utilized in example 1. 4.16 g of 1 molar aqueous solution of ferrous chloride were added at room temperature, to the mixture of 14.4 g of surfactant and 11.8 g of oil.

The aqueous phase represented 12.6% of the system, the fluorinated oil 39.3% with 48.1% of surfactant.

The microemulsion was prepared as in example 1. Then the system was heated to 60° C. and gaseous ammonia was directly bubbled from a pressure cylinder (purity 99.99%) into the reaction medium. The scrubbing was continued until the pH, initially 3.7, rose to 7.8.

The heating of the system at 60° C. under stirring was continued for 3.5 hours. After cooling to room temperature, the resulting black dispersion was purified from the excess of surfactant and from the residual ammonium chloride by washing with water and isopropanol, and by mild centrifugation to easily separate the oily black layer at the bottom from the aqueous supernatant.

The following results were obtained by the characterization of the product prepared carrying out the reaction with ammonia directly bubbled from the pressure cylinder: the magnetic particles formed the 7.8% by weight of the black dispersion which had magnetic saturation of 95 Gauss (4.22 emu/g). The particles had average magnetic diameter of 7 nm.

EXAMPLE 3

24.4 g of the same fluorinated surfactant utilized in the previous examples and 20 g of the same fluorinated oil were mixed and heated up to 90° C. 16 ml of 1 molar aqueous solution of ferrous chloride were added to the hot fluorinated solution with formation, under mild stirring, of a brown homogeneous phase containing 40.7% by weight of surfactant, 33.3% of oil and 26% of aqueous phase. The reaction system contained approximately a 0.4 molar concentration in ferrous ion. The initial pH was about 3.

Maintaining the system at 90° C. and under stirring, gaseous ammonia was bubbled from a pressure cylinder into the reaction system as in example 2, up to pH 7.5, keeping constant the temperature for 3.5 hours.

The reaction mixture was homogeneous at 90° C. under stirring but an aqueous supernatant separated at the end of heating and stirring. By cooling at room temperature and separating the aqueous supernatant by centrifugation, a magnetic dispersion was obtained which was characterized without further purifications.

A portion of the dispersion was utilized to separate the solid thereof by removal of all the components soluble either in water or in chlorofluorocarbon solvent (Delifrene).

The fluorinated dispersion had magnetic saturation of 41 Gauss. The magnetic particles were the 5% by weight of the dispersion and had average size of 7 nm. The X-rays pattern of the dried powder confirmed it to be magnetite or maghemite. Its magnetic saturation resulted to be 3366 Gauss.

The extracted powder, containing adsorbed surfacant on the particles, was the 6% by weight of the dispersion.

The fluorinated dispersion did not show macroscopic modifications after 6 months of aging.

EXAMPLE 4

The test was repeated at slight higher temperature (95° C.) in the same conditions described above. At the end of the reaction, the reaction mixture was quickly cooled and the supernatant was separated by centrifugation.

The black bottom dispersion represented about the 10% by volume of the initial reaction mixture.

A portion of this dispersion was utilized to quantify by the gravimetry method the concentration of magnetic particles with adsorbed surfactant. Such concentration resulted of 15.8%.

The magnetic saturation of the dispersion resulted of 130 Gauss and the average magnetic diameter of the dispersed particles resulted of 6 nm.

EXAMPLE 5

A magnetic dispersion was prepared as described in example 3 and thoroughly washed with water and isopropanol in several cycles up to complete removal of ammonium chloride (reaction by-product),and of the carboxylic surfactant used in the particle preparation. Centrifugation was used to speed up the supernatant separation. At the end of the washing cycles, the particles resulted completely hydrophilic.

To build up an adsorbed monolayer and stabilize them in perfluotopolyeter oil, the particles were mechanically dispersed in a 20% weight solution of a phosphoric monoester having perfluoropolyether hydrophobic chain and average MW of approximately 3000, dissolved in Galden HT70 (a fluorinated oil with high vapour pressure).

The mass ratio of surfactant to particles was selected in order to ensure the formation of an adsorbed monolayer onto the particle surface, corresponding in this case to a weight ratio of the 20% surfactant solution with respect to the particles of approximately 24. Gentle stirring and a brief sonication led to an homogeneous dispersion in the Galden oil, where also a weighed amount of Fomblin Y06, a PFPE oil with much lower vapour pressure than the above said Galden, was added to achieve a weight ratio particles/Fomblin of 6:94. Due to the mutual solubility of the two PFPE oils and the presence of the surfactant, the particles were homogeneously dispersed. The Galden oil was then evaporated at 85° C. under reduced pressure for two hours and stored at room temperature.

The resulting dispersion of the particles in Fomblin Y06 had magnetic saturation of 59 Gauss, was completely hydrophobic and a droplet in contact with water could be easily moved with a small permanent magnet. The magnetic diameter of the particles in this dispersion was of 8 nm. No detectable changes have been found after one year aging of this dispersion, showing excellent stability against coagulation.

We claim:

1. A process for preparing ultrafine inorganic particles, of average size lower than 50 nm, selected from the group consisting of metals, oxides, sulphides and carbonates, starting from microemulsions of water in a perfluoropolyether oil containing metal ions in the aqueous phase and reacting them with a gaseous or vapor reactant.

2. The process according to claim 1, wherein the particles have sizes lower than 10 nm.

3. The process according to either claim 1 or 2, wherein the inorganic particles are oxides.

4. The process according to claim 3, wherein the microemulsion comprises a metal ion with a valence lower than or equal to 2, and said process is carried out in the presence of oxygen or air.

5. The process according to claim 4, wherein the oxide is a magnetic oxide of formula gamma $Fe_2O_3$ or iron ferrites.

6. The process according to claim 5 wherein ammonia is employed as an alkalinizing agent, and the metal cations do not produce stable complexes at the reaction temperature with ammonia.

7. The process according to claim 1, wherein one or more perfluoropolyether surfactants are present.

8. The process according to claim 1, wherein the inorganic particles are extracted from the oil and redispersed in a lesser amount of oil.

9. The process according to claim 1, wherein one or more cosolvents or cosurfactants are present.

10. The process according to claim 1, wherein the perfluoropolyether has an average molecular weight from 500 to 10,000 and contains repetitive units selected from the group consisting of:

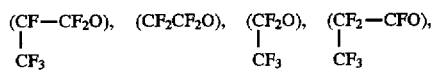

(CF$_2$CF$_2$CF$_2$O), and (CF$_2$CF$_2$CH$_2$O);

said units being statistically distributed in the polymeric chain, having neutral fluoroalkyl or perfluoroalkyl end groups.

11. The process according to claim 10, wherein the perfluoropolyether has the formula

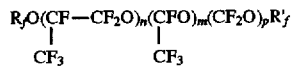

having random distribution of the perfluorooxyalkylene units, wherein $R_f$ and $R'_f$ are equal to or different from each other and are selected from the group consisting of CF$_3$, C$_2$F$_5$, C$_3$F$_7$, and CF$_2$H; n, m, p being integers.

12. The process according to claim 10, wherein the neutral fluoroalkyl or perfluoroalkyl end groups contain H or Cl.

* * * * *

UNITED STATES PATENT AND TRADEMARK OFFICE
CERTIFICATE OF CORRECTION

PATENT NO.   : 5,725,802
DATED        : March 10, 1998
INVENTOR(S)  : Alba Chittofrati et al.

It is certified that error appears in the above-indentified patent and that said Letters Patent is hereby corrected as shown below:

Claim 11, column 14, line 1, in the formula, "$(CFO)_m$" should read --$(CF_2O)_m$--.

Signed and Sealed this

Thirtieth Day of June, 1998

*Attest:*

BRUCE LEHMAN

*Attesting Officer*    *Commissioner of Patents and Trademarks*